Dec. 2, 1958  G. W. BURKARD  2,862,749

FLUSH LATCH

Filed Aug. 5, 1957  3 Sheets-Sheet 1

INVENTOR.
GEORGE W. BURKARD
BY
Lynn H. Latta
-ATTORNEY-

Dec. 2, 1958 G. W. BURKARD 2,862,749
FLUSH LATCH
Filed Aug. 5, 1957 3 Sheets-Sheet 2
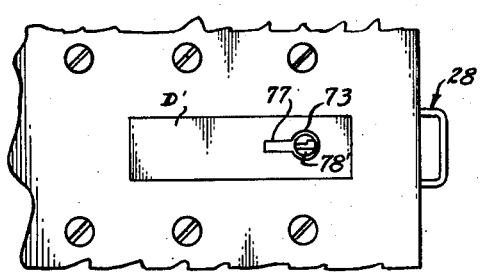
Fig. 10
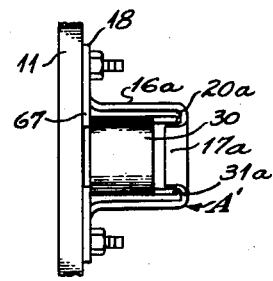
Fig. 11
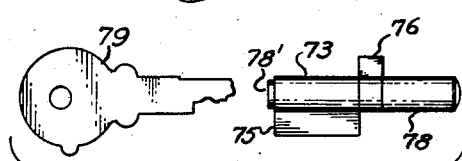
Fig. 12
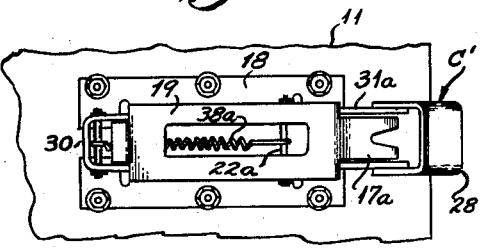
Fig. 13
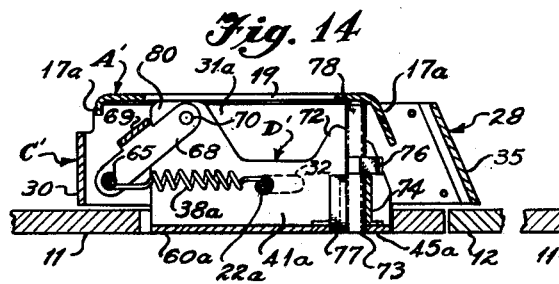
Fig. 14
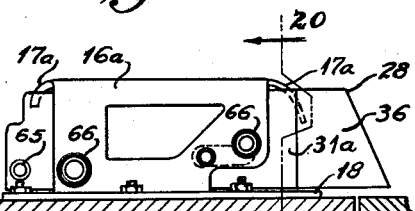
Fig. 15
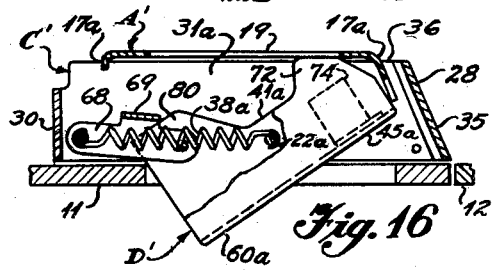
Fig. 16
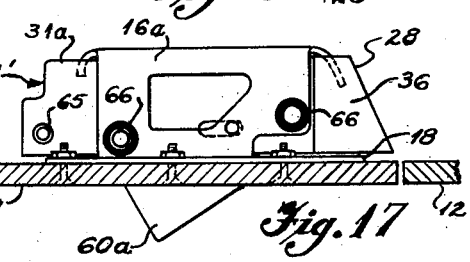
Fig. 17
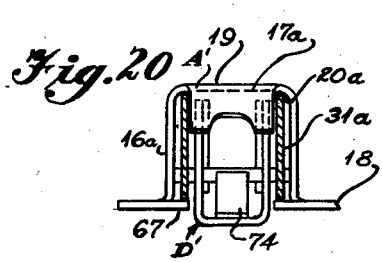
Fig. 20
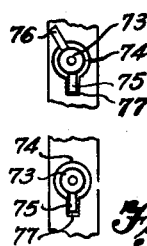
Fig. 18
Fig. 19
INVENTOR.
GEORGE W. BURKARD
BY Lynn W Latta
ATTORNEY Dec. 2, 1958 G. W. BURKARD 2,862,749
FLUSH LATCH
Filed Aug. 5, 1957 3 Sheets-Sheet 3
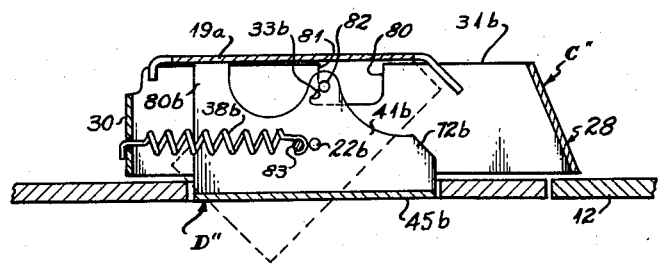
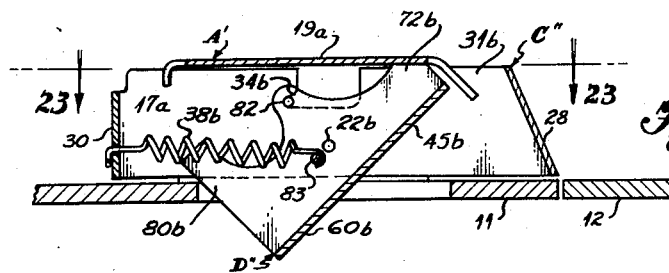
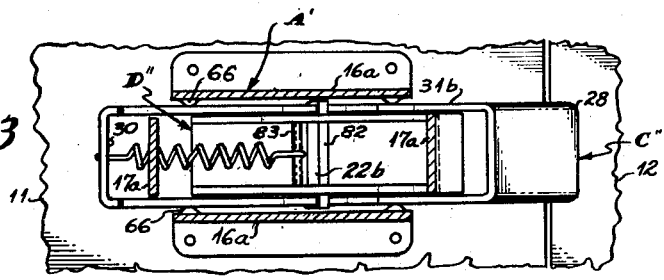
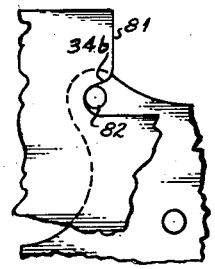
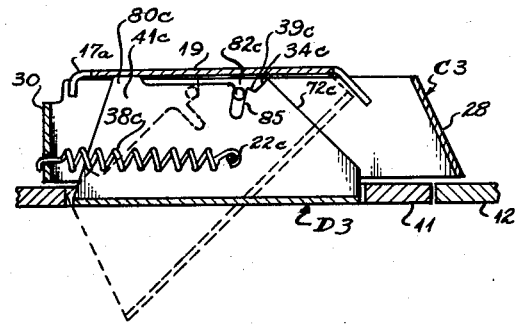
INVENTOR.
GEORGE W. BURKARD
BY
ATTORNEY United States Patent Office
2,862,749
Patented Dec. 2, 1958

2,862,749

FLUSH LATCH

George W. Burkard, Los Angeles, Calif.

Application August 5, 1957, Serial No. 676,141

10 Claims. (Cl. 292—165)

This application is a continuation-in-part of my prior application S. N. 510,127, now abandoned.

This invention relates to latches and has as its general object to provide a latch adapted to be flush-mounted in a panel with actuator parts thereof disposed flush with the outer surface of the panel, so as to offer no projection on the surface of the panel. The invention is particularly useful for latching a panel constituting a portion of the skin of an airplane which should be smooth and continuous in order to minimize aerodynamic drag. Smaller size and lighter weight for its greater load carrying capacity render this latch especially attractive for military and commercial uses.

A specific object of the invention is to provide a latch structure including a bolt releasing trigger part which is adapted to be pushed inwardly with reference to the panel surface in order to release the bolt, and including a handle part which is normally in a flush position alongside such trigger part and is projected by the depression of the trigger part so as to constitute a handle by means of which the door or other panel section, in which the latch is mounted, may be manipulated between open and closed positions.

The invention further contemplates such a latch structure wherein a bolt is spring projected toward latching position, is positively retracted by the actuation of the above mentioned trigger part, and is automatically locked in the retracted position until released by the actuation of a part other than the trigger part. More specifically, the invention aims to provide a latching apparatus embodying a trigger part for positive actuation of a bolt to a retracted position, a handle part which is projected to an operative position by the action of retracting the bolt, the bolt and the handle part being automatically locked in these positions, and the handle being operative, when pressed inwardly from its projected position, to release the bolt for return movement to its latching position in response to its spring loading.

A still further object is to provide such a latching structure wherein the actuation of the handle part to unlock the bolt likewise effects the resetting of both trigger and handle parts in their normal flush positions.

Other objects are to provide a latching structure of the character indicated, of relatively simple yet sturdy and durable construction, positive and reliable in operation, so as to be most useful in aircraft construction, even as a component taking considerable loads.

Other objects will become apparent in the ensuing specifications and appended drawing in which:

Fig. 10 is a front view of a mounted latch assembly embodying a modified form of the invention;

Fig. 11 is a front end view of the same;

Fig. 12 is an exploded view of the lock and key assembly of the same;

Fig. 13 is a rear view of the assembly of Fig. 10;

Fig. 14 is a longitudinal sectional view of the same showing the bolt in its normal projected position;

Fig. 15 is a side view of the same;

Fig. 16 is a longitudinal sectional view of the latch of Fig. 10 showing the bolt in its retracted position;

Fig. 17 is a side view of the same;

Fig. 18 is an end view of the locking assembly in the locked position;

Fig. 19 is an end view of the locking assembly in the lock-releasing position;

Fig. 20 is a cross-sectional view of the latch of Fig. 10, taken on line 20—20 of Fig. 15.

Fig. 21 is a longitudinal sectional view of another modified form of the invention;

Fig. 22 is a sectional view of the same showing the parts in bolt-retracted position;

Fig. 23 is a plan view of the same;

Fig. 24 is a fragmentary view of the same; and

Fig. 25 is a longitudinal sectional view of another modified form of the invention.

*General description of assembly of parts*

Figure 2:
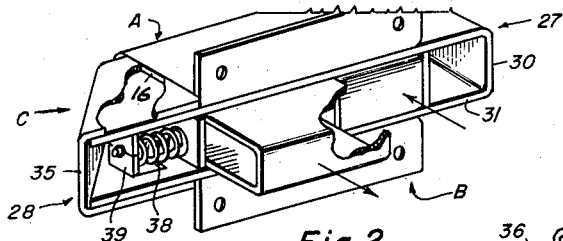
Fig. 2 is a fragmentary perspective view of the same with parts shown in bolt retracted position.
Figure 8:
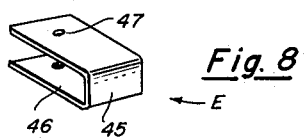
Fig. 8 is a perspective view of the trigger.

Referring now to the drawings in detail, there is illustrated in Figs. 1–9 inclusive, as an example of one form in which the invention may be embodied, a flush latch comprising a housing A (Fig. 6); a cover B; a bolt C (Fig. 7); a lever link D (Fig. 5); a bolt actuating trigger part E (Fig. 8); a handle part F (Fig. 9); and a number of minor parts including springs and pins which will be referred to hereafter in the detailed description of the mechanism.

Figure 4:
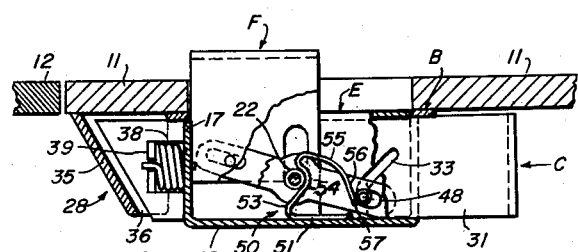
Fig. 4 is a fragmentary plan view of the latch, with parts broken away, shown in section and disposed in the bolt retracted position of Fig. 2.
Figures 3, 5:
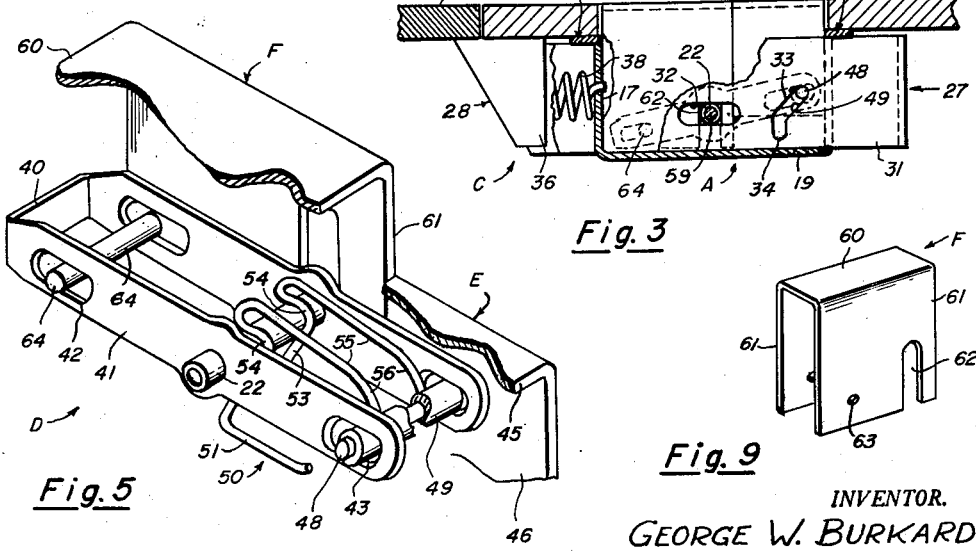
Fig. 3 is a fragmentary plan view of the latch, with parts broken away, shown in section and disposed in the normal positions of Fig. 1.
Fig. 5 is an enlarged fragmentary perspective view showing inner mechanism of the latch.
Figure 9:
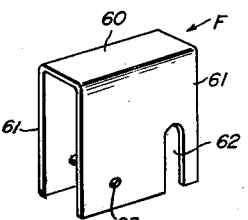
Fig. 9 is a perspective view of the handle.

Briefly describing the cooperative relationship between the main parts identified above, before proceeding to the detailed description of the structural aspects of the latch, it may be initially pointed out that the latch is adapted to be installed in a door or cover panel or other panel member, indicated at 11 in Figs. 3 and 4, and the bolt C is adapted to latch behind an adjoining marginal portion of a framing panel 12 to which the panel 11 is movably related (as by being hinged along a margin opposite that shown in the drawing, where the latch is mounted in a swinging door or cover member, such as the cowl of an airplane).

Fig. 3 illustrates the latch with its parts in normal latching position wherein bolt C is projected and engaged behind panel member 12 so as to latch panel member 11 to panel member 12; and wherein the outer ends of trigger part E and handle part F are flush with the outer face of co-planar panel members 11 and 12.

Referring now to Fig. 4, it may be observed that trigger part E has been depressed inwardly while handle part F has been projected outwardly beyond the plane of panel 11 to a position where it may be grasped between the finger tips and utilized as pull handle to swing panel 11 outwardly and away from the plane of panel member 12; bolt C having been retracted to a position where it will clear the edge of the panel 12 which defines the opening that is closed by panel member 11. It will be apparent that the invention achieves its greatest usefulness when the latch is mounted in a swinging door or other movable panel member which is to be shifted outwardly with reference to a fixed panel member framing an opening for the same.

Fig. 4 illustrates the parts in positions which are stabilized (against the pull of the spring members biasing them for return toward their normal positions of Fig. 3, as will be more fully explained hereinafter) by a holding action which takes place when trigger E is depressed to the full limit of its movement, and which holds the bolt C in its retracted position so that the operator's finger pressure against the trigger E can be released in order to free the hand for grasping the handle part F.

Having used the handle part F to draw the panel member 11 outwardly to an "open" position, the operator may now, if he desires, restore bolt C to its projected position of Fig. 3, wherein it is free to engage the edge of the aperture in panel member 12 for a spring-resisted automatic yielding past such edge, followed by snapping into latching position, in accordance with well known latch bolt operation. This release of the bolt back to its operative position is accomplished simply by pressing against the end of handle part F, whereby the handle part F and trigger part E are returned to their normal flush positions of Fig. 3. Alternatively, the panel member 11 may be returned to a "closed" position lying in the plane of panel member 12 while the parts remain in the positions of Fig. 4, bolt C clearing the edge of the aperture in panel 12 without contacting the same; and thereafter the parts may be returned to their positions of Fig. 3 by finger pressure against handle part F, restoring the handle and trigger parts to their flush positions and causing the bolt C to snap into latching position by spring loaded action as will be more fully explained hereinafter. The fact that all moving parts are completely enclosed in the housing make the invention ideal for high temperature applications.

*Detailed description of latch (Figs. 1–9)*

Figure 6:
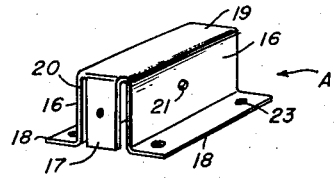
Fig. 6 is a perspective view of the housing.

A. *Housing.*—Referring now to Fig. 6, housing A, which may be of blanked and formed sheet metal, and which is generally of elongated box form, includes opposed parallel longitudinal side members 16, end members 17, mounting flanges 18 bent outwardly from the side margins of side members 16, and a central web 19 from which the side wall members and end wall members 16 and 17 are bent. End wall members 17 are of less width than the spacing between the inner faces of side wall members 16, thereby defining open corner slots 20 for the reception of respective side members of bolt C. Side wall members 16 have opposed pivot apertures 21, in which is mounted a pivot and spacer 22 (Figs. 3 and 5).

Figure 1:
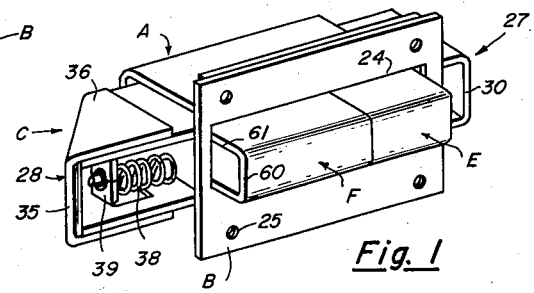
Fig. 1 is a perspective view of a flush latch embodying my invention, with parts in normal, flush and latching position.

B. *Cover plate.*—Cover plate B (Fig. 1) may consist in a flat rectangular plate having an elongated aperture 24 to register with the open side (bottom of Fig. 6) of housing A and having holes 25 for alignment with holes 23 of housing A, whereby the assembled latch may be attached to panel 11. Aperture 24 is substantially filled by the trigger part E and handle part F, the latter projecting outwardly therethrough (Fig. 1). In the assembled latch, the cover plate B is interposed between housing A and panel 11 (Figs. 3 and 4).

Figure 7:
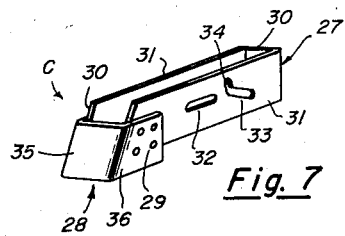
Fig. 7 is a perspective view of the bolt.

C. *Bolt.*—Referring now to Fig. 7, bolt C comprises a slide yoke, indicated generally at 27, and a shoe 28, secured thereto (as by spot welding at 29) in a selected position of adjustment. Slide 27 is of yoke-form including an end web 30 and parallel, spaced side arms 31, the latter being provided with a pair of opposed slide slots 32, parallel to the longitudinal axis of the bolt, and a pair of opposed bayonet-slots each including a relatively long camming portion 33, inclined with reference to the longitudinal axis of the bolt, and a relatively short terminal portion disposed substantially at right angles to the longitudinal axis of the bolt.

Shoe 28 comprises a web portion 35 which is inclined at an acute angle with reference to the longitudinal axis of the bolt, and a pair of spaced parallel side arms 36 which embrace the side members 31 of slide 27 and are secured thereto as previously indicated. In fabricating the bolt, the position of shoe 28 with reference to slide 27 may be selected in accordance with specifications of a particular installation to be made. Adjustment transversely with respect to slide 27 is provided for. Fig. 7 illustrates an adjustment wherein shoe 28 projects transversely beyond side edges of slide arm 31. Figs. 3 and 4 illustrate an adjustment wherein the edges of shoe arms 36 are flush with the adjacent edges of arms 31. By this arrangement, any thickness of skin plus doubler reinforcing swatch in an aircraft, can be accommodated in increments down to a thousandth of an inch, with no shims or spacers being required in the installation of the latch.

Bolt C is assembled between housing A and cover B with its arms 31 slidably projecting through slots 20 at both ends of the housing, the outer faces of arms 31 bearing against the inner faces of housing side wall members 16 and the inner faces of arms 31 bearing against the lateral edges of housing end members 17. As will become more clearly apparent hereinafter, trigger part E and handle part F are embraced between arms 31, and lever link D is embraced within trigger and handle parts E and F.

Bolt C is spring loaded toward its projected position shown in Fig. 3, by a loading spring 38 (preferably a coil spring) acting under compression between an end member 17 of housing A and tabs 39 lanced out of and bent inwardly from slide arms 31 of bolt slide 27. Spring 38 may be provided with bent tips projecting through apertures in end member 17 as shown in Fig. 3, and in tabs 39.

D. *Rocker link.*—Referring now to Fig. 5, rocker link D is of elongated yoke form, including at one end a web 40 to which are integrally attached a pair of parallel arms 41 disposed in parallel spaced planes, with their outer faces fitting snugly within handle and trigger parts E and F. At their ends adjacent web 40, arms 41 are provided with longitudinally extending slots 42 and at their opposite ends, arms 41 have longitudinal slots 43. Intermediate their ends, arms 41 are provided with apertures in which are mounted the respective end portions of the fulcrum-spacer (sleeve) 22, said end portions projecting through slots 62 in handle part F and into apertures 21 of housing A, so as to mount the link D for tilting movement about the fulcrum-spacer 22 as a fulcrum.

E. *Trigger part.*—Trigger part E (Fig. 8) consists in a sheet metal yoke including an end web 45 and spaced parallel arms 46 positioned to snugly embrace the outer faces of link arms 41, and having therein a pair of aligned opposed apertures 47. In the assembled latch, trigger part E projects through one end portion of aperture 24 in cover B, extends transversely between the side arms 31 of bolt C, and is closely embraced thereby. A drive pin 48, with a sleeve 49 surrounding the same, pivotally connects the free ends of link arms 41 to trigger E, the ends of pin 48 being received in the apertures 47 of the trigger and the end portions of sleeve 49 being received in slots 43 of link arms 41. Sleeve 49 functions as a roller to reduce friction. The ends of pin 48 project through bayonet slots 33, 34 of bolt arms 31 and are retained between the side wall members 16 of housing A, against which they have sliding end bearing engagement. When length of arms 46 is varied, different door thicknesses in increments of one thousandth of one inch, are accommodated regardless of skin plus doubler thickness at the bolt without the use of shims or spacers.

A link spring, indicated generally at 50 in Fig. 5, has a compound function in controlling the operation of rocker link D in cooperation with parts E and F. Spring 50 includes a pair of feet 51, a pair of legs 53 projecting upwardly from feet 51 and indented at 54 for positional securing of the spring against spacer sleeve 22 and between fulcrum-spacer 22 and housing web 19; and a pair of arms 55 projecting from legs 53 above feet 51, and a pair of fingers 56 projecting downwardly from arms 55 and terminating in a transverse connecting web 57 (Fig. 4). Fingers 56 bear against roller sleeve 49. In its normal unstressed condition, spring 50 has its feet 51 and arms 55 projecting in diverging relation from legs 53 and fingers 56 extend from arms 55 at a more obtuse angle than that shown in Fig. 4. When the spring is assembled, arms 55 are stressed downwardly toward feet 51 so as to exert a lift against the free ends of link arms 41 through roller 49, thus tending to tilt the rocker link D counterclockwise as viewed in the drawing, toward the normal position shown in Fig. 3 and to move sleeve 49 upwardly in bayonet slots 33, 34. Also, fingers 56, in the assembled latch, are flexed toward the legs 53 so as to bear outwardly against drive roller 49 and so that indentations 54 will bear snugly against fulcrum spacer 22 to maintain the spring in position.

The yielding outward pressure of fingers 56 against drive roller 49 causes the same to be retained in the portions 34 of bayonet slots 33 when moved thereto by depression of trigger E. This pressure is sufficient to dominate the more yielding upward pull of arms 55 tending to shift the sleeve 49 upwardly in bayonet slots 33. When the sleeve 49 is thus retained in portions 34 of the bayonet slots, the bolt C will be locked in its retracted position of Fig. 4. By shifting link D counter-clockwise to the point where the ends of sleeve 49 enter the inclined bayonet slot portions 33, the diagonally applied pressure of fingers 56 against sleeve 49 will move sleeve 49 in bayonet slots 33, with a snap action, away from the position shown in Fig. 4, shifting link D to its normal position shown in Fig. 3, the camming action of sleeve 49 in slots 33 assisting the loading spring 38 in moving bolt C to its projected position of Fig. 3.

F. *Handle part.*—Handle part F is of flat yoke form (Fig. 9) including a web 60 and a pair of spaced parallel side members 61 projecting therefrom, members 61 being provided in their ends with a pair of opposed open slots 62 at one side and a pair of opposed pin apertures 63 at the other side. Slots 62, in the assembled latch, slidably embrace fulcrum-spacer 22. A link pin 64 (Figs. 3 and 5) extends through slots 42 of link D and has its respective ends received in apertures 63 of the handle part F and in sliding bearing engagement with the inner walls of housing side members 16, being thus retained against endwise shifting. Handle part F has its side edges adjacent pin 64 bearing against the inner surface of end wall member 17 (Fig. 4) and its opposite side edges bear against the adjoining side edges of trigger part E. The remote side edges of trigger part E bear against the inner wall of the other end member 17. This nesting of the trigger and handle parts within the housing provides adequate retention and positioning of the trigger and handle parts for transverse shifting movements with reference to the housing and bolt assembly, without any possibility of canting or binding occurring. The lateral outer faces of parts E and F are in sliding bearing engagement with the inner lateral walls of housing A.

The pin 64 pivotally connects handle part 60 to lever link D so that when the latter is shifted to its position of Fig. 4 by depression of trigger part E, handle part F will automatically be projected to its Fig. 4 position; whereas when handle part 60 is depressed, link D will be tilted in the opposite direction, bringing the parts back to their flush positions of Fig. 3. Actually, the handle part F need only be pressed inwardly a short distance, until sleeve 49 is released from bayonet slot terminal portions 34, whereupon the combined action of springs 50 and 38 will cause the parts to return automatically to their normal positions. When the length of arms 61 is varied, different door thicknesses in increments of one thousandth of an inch are obtained regardless of skin plus doubler thickness at bolt without the use of shims or spacers.

The invention provides for easy assembling of the parts in a predetermined order of assembling steps which need not be elaborated upon except to point out that the trigger and handle parts E and F are first assembled to lever D and bolt C and are subsequently inserted into housing A and secured in assembly by the insertion through fulcrum spacer 22, of a screw 59 (Fig. 3) with a head at one end and its other end threaded for locking into one of the apertures 21. Spring 38 is assembled in the final stages of assembly. Plate B is assembled to the housing at the time the latch is installed in a door.

*Operation (Figs. 1–9)*

The operation of the latch has been hereinbefore preliminarily outlined and various stages thereof described in detail in connection with the description of the various parts, and will therefore be only briefly reviewed at this point.

Assuming that the installed latch is in its normal latching position of Fig. 3, with bolt C engaged behind panel 12, the movable panel 11 may be released by placing the forefinger or thumb against trigger part E and pushing it inwardly. Drive pin 48 and roller 49, operating in bayonet slots 33, will shift from the outer ends of the slots to the locking ends 34 thereof, exerting a camming action against the sides of the slots to shift bolt C rightwardly as viewed in Fig. 3, to the retracted position shown in Fig. 4 where the ends of pin 46 have entered the locking ends 34 of the bayonet slots. The fingers 56 of spring 50 having been flexed toward legs 53 by this movement of pin 48, will exert sufficient pressure against the roller 49 to lock the ends of the pin 48 in the portions 34 of bayonet slots, thus locking the bolt C and handle part F in the bolt retracted position of Fig. 4.

In the retraction of the bolt, spring 38 has been further compressed, exerting a yielding load tending to project the bolt back to its latching position. It may be released for movement to this position by pressing handle part F inwardly to free the ends of pin 48 from portions 34 of the bayonet slots, whereupon combined loading of springs 50 and 38 will cause the bolt to be quickly shifted back to its projected position and the link D to be tilted back to its normal position of Fig. 3, spring 50 being the primary means for tilting the link and the spring 38 being the primary means for projecting the bolt.

As previously indicated, this return of the latch to its normal condition may be effected while the door is still open and thereafter the door may be "slammed" shut with the inclined outer face of web member 35 of the bolt shoe 28 exerting a camming action against the edge of the aperture in panel 12 to retract the latch bolt and trigger and projecting handle as the latch bolt passes through the aperture and the spring 38 then again shifting the latch bolt to its projected position behind panel 12 in which the cover panel 11 is latched shut. Alternatively, the panel 11 may first be moved to its closed position with the latch in the condition of Fig. 4 and the handle part F may then be pushed to release the bolt for projection to its latching position. Four mounting holes and a simple rectangular cutout frame prepare the panel for latch installation. The trigger and handle will not return to their normal flush positions unless bolt C is fully latched (safety feature). It is conceivable that any combination of this basic invention could be used as a multiple latch; to include two shoes, two handles and one trigger; or a latch having a trigger part without the handle part; or by using the latch as a lock by inserting a special retainer through trigger and handle; or any other similar arrangement.

An additional use of this invention might be derived by using the three-directional motions of bolt, trigger and handle parts in an hydraulic valve system or electrical switch components or any other three-directional motions mechanical control assembly.

The rocker link D and the trigger and handle parts E and F, operatively connected to the respective ends thereof, together with the connecting pins 48, 49, 64, fulcrum 22 and springs 38 and 50, collectively constitute actuator means which term is occasionally used hereinafter to designate this combination of elements.

The invention as disclosed in Figs. 10–20

Referring now to Figs. 10–20, I have shown therein a modified form of the invention wherein, instead of the separate trigger part E, handle part F, and rocker link D, there is provided a single integral actuator D' of narrow channel form, having at one end a trigger part 45a, having at its other end a handle part 60a, and having a pair of laterally spaced, parallel side members 41a which, as joined by the trigger and handle parts 45a, 60a, constitutes a rocker link corresponding broadly to the link D of Fig. 5.

The bolt C' is generally similar to the bolt C of Fig. 7 and the corresponding parts thereof are indicated by numerals corresponding to those of Fig. 7. The bolt C' does not have the bayonet slots 33 of Fig. 7, but does have in its slide arms 31a the longitudinal slots 32 through which is extended the fulcrum pin 22a on which the actuator D' is pivoted. Instead of the compression spring 38 of Fig. 4, there is provided a tension spring 38a, stretched between the fulcrum pin 22a and an anchor pin 65, the ends of which are secured in the slide arms 31a of the bolt C'. Thus the pull of spring 38a biases the bolt C' toward its projected position of Fig. 15.

Slide arms 31a are slidably received in corner slots 20a (Figs. 11 and 20) defined between end members 17a and side wall members 16a of housing A', the end members 17a being in the form of tongues bent forwardly from the rear wall web 19 of the housing.

The bolt is located against lateral displacement by the bearing engagement of its inner lateral walls against the edges of end members 17a and by the bearing engagement of its outer lateral walls against dimples 66 in the side wall members 16a of housing A' at the respective ends thereof. Thus there is provided substantial spacing between the slide arms 31a and the side wall members 16a to insure free movement of the bolt in the housing in spite of any accumulation of dust particles etc. between the two members. The bolt C' is restrained against displacement at right angles to the plane of panels 11, 12 by the bearing engagement of the forward and rear edges of slide arms 31a against tabs 67 (Figs. 11 and 20) formed as inward extensions of flanges 18, and with the inner face of back wall member 19 of the housing.

The linkage for connecting the rocker links 41a to the bolt C' for projecting the bolt and locking it in its projected position, instead of the pin and bayonet slot connections 33, 49 of Fig. 3, consists in a pair of toggle links 68 joined by a cross web 69, pivoted upon anchor pin 65 at one end, and pivoted as by means of rivets 70 at the other end, to the respective side members of the rocker link 41a. The pins 65 and 22a constitute the remote pivots of toggle linkage comprising the combination of links 68 and 41a. Normally, the toggle links 68 extend diagonally at an angle of more than 45° to the longitudinal axis of the bolt as shown in Fig. 14. Upon the pressing of trigger part 45a, the links 68 move slightly past the axis of alignment between the respective pins 22a and 65, to a point where a pair of stop fingers 72 on rocker link 41a engage the back web 19 of the housing, whereupon the bolt is held in the retracted position to which it has been drawn by the action of straightening the toggle linkage. This position is shown in Fig. 16. Thus the handle part 60a is held in the projected position where it may be utilized as a handle for opening the closure panel 11.

Means is provided for locking the latch assembly in its latching position of Fig. 14. Such locking means comprises a two-part tumbler unit and a key, shown in Fig. 12. Since this locking unit in itself is not my invention, it has not been shown in detail. In general, it comprises a tubular body 73 receivable in a segmental cylindrical socket 74 secured to the trigger part 45a, the body 73 having an integral spline 75 which engages in a slot 77 (Fig. 18) in the socket 74, to anchor the body 73 against rotation; a locking lug 76 attached to a key actuated tumbler 78 which is rotatably mounted in body 73; and a stem 78' which may constitute an extension of tumbler 78 and is adapted to abut the back wall member 19 of the housing in order to prevent depression of trigger part 45a when locking lug 76 extends over and engages against the end of socket 74 as shown in Fig. 14, which illustrates the locking position. By inserting a key 79 in the tumbler 73 and rotating the same to align locking lug 76 with slot 77, the entire locking unit can be withdrawn from the socket 74, leaving the actuator member D' free to be tilted to the bolt retracting position shown in Fig. 16.

The pivots 70 are attached to projecting stop portions 80 of the rocker link arms 41a, these stop portions 80 being adapted to engage the back web 19 of the housing to locate the toggle link D' in the normal position shown in Fig. 14. Similarly, the stop fingers 72 engage the back wall 19 to limit the tilting movement of the rocker link D' thus determining the position of projection of handle 60a as indicated in Fig. 16.

The invention as shown in Figs. 10–20 has the advantage of previously described form in that with the closure panel 11 in an open position and the latch bolt in a projected position as shown in Fig. 14, the panel (door) 11 can be slammed shut and the bolt C' will automatically retract as the shoe face 35 engages the edge of the door opening in panel 12, such retraction being accommodated by straightening of the toggle link 68 to a point just short of its dead center position, which will be sufficient to allow the bolt shoe 28 to clear the door opening, the rocker link D' tilting substantially to its position of Fig. 16 and the spring 38a elongating to correspond to the extension of the toggle linkage. As soon as the bolt has cleared the door opening, the spring 38a will pull the linkage back to the normal position of Fig. 14.

The invention as disclosed in Figs. 21–24

Figs. 21–24 disclose another modified form of the invention wherein the toggle link 68 is dispensed with and the bolt retracting and locking functions are embodied in a direct connection between the rocker link D" and the slide-arms 31b of the bolt C".

The housing A' may be the same as the housing A' of Figs. 10–20, the same numerals being applied thereto. The bolt C" may be the same as the bolt C' of Figs. 10–20 with the exception that it is provided with a pair of bayonet notches 33b corresponding broadly to the slots 33 of Figs. 1–9, the notches 33b having at their ends remote from bolt shoe 28, a pair of bearing lands 81 which are normally spring biased against the projecting end portions of the drive pin 82 extending transversely through the respective side arms 41b of the rocker link D". The notches 33b are further provided with locking shoulders 34b defined by undercut extensions of notches 33b at the inner corners thereof remote from bolt shoe 28. The drive pin 82 is so located with respect to the fulcrum pin 22b of rocker link D" that the drive pin 82 will drop beneath the locking shoulders 34b when the rocker link D' has arrived at its limit of tilting movement (Fig. 22) in response to fingertip pressure against the trigger part 45b of the rocker link. The locking shoulders 34b are developed along a circumferential arc (Fig. 24) corresponding to the path of movement of the outer extremity of drive pin 82 at the point where it drops beneath the locking shoulders 34b. As the drive pin 82 reaches this position, the pull of the bolt projecting spring 38b will develop a wedging engagement between the shoulder 34b and the drive pin 82, with sufficient frictional locking effect to lock the part securely in the position shown in Fig. 22 until such time as finger pressure is applied to the projecting handle 60b. This locking action is effective to resist a slight spring load tending to return the rocker link D" to its normal position, this return load being developed as the result of the displacement of anchor pin 83, to which the inner end of spring 38b is anchored, from an on-center position (Fig. 21) with relation to the axis between fulcrum pin 22b and the point of attachment of spring 32b to the end of bolt C", to an arcuately displaced position shown in Fig. 22.

Upon pressing the handle 60b in its projected position of Fig. 22, the pin 82 will be released from the locking shoulder 34b (no jamming will occur because of the disposition of shoulders 34b along a circumference of the arcuate movement of drive pin 82) and the land 81 will then engage the drive pin 82 and will drive the rocker link D" back to its normal position of Fig. 21 as the bolt C" is drawn back to its normal projected position of that figure.

Upon slamming the door panel 11, the inclined face of shoe 28 will ride against the door opening defined by panel 12 and the bolt will be retracted without affecting the rocker link D", due to the spacing between the land 81 and the opposite end of notch 33b.

In this form of the invention, the outer end of spring 38b can be simply anchored in an aperture in the web portion 30 of bolt C", as shown in Fig. 21.

*The invention as disclosed in Fig. 25*

Fig. 25 illustrates another modification of the invention wherein the rocker link D3 is similar to the rocker link D" of Figs. 21–24 with the exception that instead of the drive pin 82 being secured thereto, the drive pin 82c is mounted in the bolt C3 (the same as the bolt C3 of Figs. 10–16) and the driving connection is effected by engagement of pin 82c in drive slots 85 in side arms 41c of the rocker link D3. Locking in this case is effected by engagement of the drive pin 82c behind locking shoulders 34c formed in the ends of stop fingers 72c in circumferential relation to the axis of fulcrum pin 22c. Stops 80c function the same as stops 80 of Figs. 10–20.

The drive slots 85 are narrow as indicated so that the pin 82c will be always in engagement with both sides of the slots, with only slight clearance to permit freedom of movement. Thus the bolt C3 of rocker link D3 will be in driving engagement with one another in both directions at all times, so that any retraction of the bolt by forcing it through the door opening will result in tilting the link D3 to the handle projecting position thereof; and vice versa, the normal operation of the rocker link D3 by finger pressure to its tilted position will effect retraction of the bolt. This form of the invention further distinguishes in that the spring 38c is hooked directly to the fulcrum pin 22c of the rocker link, there being no need for spring biasing the rocker link in its normal position. The same locking action will occur as in the form of Figs. 21–24, the locking shoulders 34c functioning the same as shoulders 34b.

I claim:

1. A latch for latching to the marginal portion of a framing panel, an opposed marginal portion of a door panel having an opening in its said marginal portion, comprising: a housing having means for mounting the same to said opening; trigger and handle parts mounted in said housing for movement in parallel paths normal to the plane of said door panel, their outer ends extending into said opening and being normally substantially flush with said plane; a rocker link the respective ends of which are pivotally connected to said parts respectively, said link being fulcrummed intermediate its ends in said housing for tilting movement in which one end moves inwardly in response to depression of said trigger part while its other end moves outwardly so as to project said handle part outwardly of said plane; a bolt mounted in said housing for sliding movement longitudinally thereof and having a projecting end portion adjacent the margin of said door panel, movable to a projected position engageable behind the opposed marginal portion of said framing panel; a transversely extending roller providing the pivotal connection between said trigger and link and providing also a camming connection with said bolt such as to translate inward movement of said trigger part into retracting movement of said bolt; means spring-loading said trigger and handle parts and said bolt for return movements to their flush and projected positions respectively; said pivotal connection and camming means including automatic locking means for retaining the parts in their positions of retraction of the bolt and projection of the handle part until released by inward pressure against said handle part, said link being operative, in response to such inward handle pressure, to release said parts and bolt for said spring-loaded return movements.

2. A latch for latching to a marginal portion of a framing panel, an opposed marginal portion of a door panel having an opening in its said marginal portion, comprising: a housing having means for mounting the same to said openings; trigger and handle parts mounted in said housing for movement in parallel paths normal to the plane of said door panel, their outer ends extending into said opening and being normally substantially flush with said plane; a rocker link, the respective ends of which are pivotally connected to said trigger and handle parts respectively, said link being fulcrumed intermediate its ends in said housing for tilting movement in which one end moves inwardly in response to the pressure of said trigger part while its other end moves outwardly so as to project said handle part outwardly of said plane; a bolt mounted in said housing for sliding movement longitudinally thereof and having an end portion normally adjacent the margin of said door panel, said bolt being movable to a projected position engageable behind the opposed marginal portion of said framing panel; means providing a camming connection between said bolt and said link such as to translate inward movement of said trigger part into retracting movement of said bolt; means spring loading said trigger and handle parts and said bolt for return movements to their flush and retracted positions respectively; and means operable between said bolt and rocker link to automatically hold said parts and bolt in their positions of retraction of the bolt and projection of the handle part until released by inward pressure against said handle part, said link being operative, in response to such inward handle pressure, to release said parts and bolt for said spring loaded return movement.

3. A latch for latching to a marginal portion of a framing panel, an opposed marginal portion of a door panel having an opening in its marginal portion, comprising: a housing having means for mounting the same to said opening; trigger and handle parts mounted in said housing for movement in adjacent parallel paths normal to the plane of said door panel, their outer ends extending into said opening and being normally substantially flush with said plane; a rocker link, the respective ends of which are pivotally connected to said trigger and handle parts respectively, said rocker link being fulcrummed intermediate its ends in said housing for tilting movement in which one end moves inwardly in response to the pressure of said trigger part while its other end moves outwardly so as to project said handle part outwardly of said plane; a bolt mounted in said housing for sliding movement longitudinally thereof and having an end portion normally adjacent the margin of said door panel, said bolt being movable to a projected position engageable behind the opposed marginal portion of said framing panel; means responding to inward movement of said trigger part for retracting said bolt; means automatically operating upon retraction of said bolt to lock it in its retracted position, said means being released by inward movement of said handle part; and spring means biasing said bolt for projecting movement occuring when said locking means is thus released.

4. In a latch for latching to a marginal portion of a framing panel, an opposed marginal portion of a door panel having an opening in its said marginal portion; an elongated rectangular housing comprising a web providing a back wall member, a pair of parallel side wall members bent forwardly from the side margins of said web, a pair of mounting flanges bent outwardly from the forward margins of said side wall members, and a pair of end wall members bent forwardly from the respective ends of said web and having side margins spaced inwardly from the inner faces of said side wall members to define slide slots at the corners of the housing, said housing being adapted to register with said marginal opening with said flanges mounted against the face of said door panel and with one end of the housing disposed adjacent the margin of the door panel that is to be latched to said framing panel; a cover plate having an elongated aperture registering with the area within the housing and side portions superimposed upon said mounting flanges; a bolt comprising a slide including a rear end web and a pair of slide arms extending in parallel relation therefrom and slidably extended through said slots, and a shoe comprising a pair of side arms embracing and secured to the forward ends of said slide arms and a web bridging said side arms and disposed at an acute angle to the longitudinal axis of the bolt; a trigger part and a handle part, each of rectangular arch form and including an end web and a pair of side members projecting at right angles thereto and parallel to one another, said trigger and handle parts each being disposed within and snugly embraced by the slide arms of said bolt slide and slidable transversely of the bolt with the web connected end portions of said trigger and handle parts projecting through said cover plate aperture for finger-tip actuation thereof; a rocker link disposed within said trigger and handle parts with its longitudinal axis generally parallel to that of said bolt and with its respective ends operatively associated with said trigger and handle parts, said rocker link being fulcrummed in said housing intermediate its ends for tilting movement in response to inward movement of said trigger part under finger-tip pressure while projecting said handle part outwardly; camming means operatively connecting said bolt and rocker link for effecting the projection of said bolt when said rocker link is tilted by inward movement of said trigger; means automatically operating upon projection of said bolt to lock it in its retracted position, said means being released by inward movement of said handle part; and spring means biasing said bolt for projecting movement occurring when said locking means is thus released.

5. In a flush latch for latching to a marginal portion of a framing panel, an opposed marginal portion of a closure panel having an aperture in its said marginal portion; an elongated rectangular housing comprising a web providing a back wall member; a pair of parallel side wall members bent forwardly from the side margins of said web, a pair of mounting flanges bent outwardly from the forward margins of said side wall members, and a pair of end members bent forwardly from the respective ends of said web and having side margins spaced inwardly from the inner faces of said side wall members to define slide slots at the corners of the housing, said housing being adapted to be mounted to said closure panel in communication with said marginal aperture and with one end of the housing disposed adjacent the margin of the closure panel that is to be latched to said framing panel; a bolt comprising a slide including a rear end web and a pair of slide arms extending in parallel relation therefrom and slidably extended through said slots, and a shoe comprising a pair of side arms embracing and secured to the forward ends of said slide arms and a web bridging said side arms and disposed at an acute angle to the longitudinal axis of the bolt; and actuator means including a rocker link and trigger and handle parts operatively connected to respective ends of said link for movement in paths generally normal to the plane of said door panel, the outer ends of said trigger and handle parts being normally substantially flush with said plane, said rocker link being fulcrummed intermediate its ends in said housing for tilting movement in which one end thereof moves inwardly in response to pressure applied to said trigger part while its other end moves outwardly to project said handle part outwardly of said plane so that it may be grasped for opening said closure panel; and means linking said bolt to said rocker link for projecting said bolt in response to inward movement of said trigger part and for holding said bolt in its projected position, said last means being operable in response to inward movement of said handle part to release said bolt for return movement to a retracted position; and spring means yieldingly biasing said bolt for movement to said retracted position when thus released.

6. A latch for latching to a marginal portion of a framing panel, an opposed marginal portion of a closure panel having an aperture in its said marginal portion, comprising: an elongated housing having means for mounting the same to said aperture; actuator means comprising a rocker link and trigger and handle parts operatively connected to respective ends of said rocker link for movement in adjacent substantially parallel paths substantially normal to the plane of said closure panel, said trigger and handle parts being normally substantially flush with said plane, said rocker link being fulcrummed intermediate its end in said housing for tilting movement in which one end moves inwardly in response to pressure applied to said trigger part while its other end moves outwardly so as to project said handle part outwardly of said plane; a bolt mounted in said housing for sliding movement longitudinally thereof and having an end portion normally adjacent the margin of said closure panel, said bolt being movable to a projected position engageable behind the opposed marginal portion of said framing panel; means linking said actuator means to said bolt and operative in response to inward movement of said trigger part for projecting said bolt and for automatically holding said bolt in its projected position, said last means being operable in response to inward movement of said handle part to release said bolt for retracting movement; and spring means yieldingly biasing said bolt in the direction of said retracting movement.

7. A latch as defined in claim 6, wherein said linking means comprises a pair of toggle links pivotally connected at respective ends thereof to said rocker link and to said bolt at the end of the bolt remote from the latching end thereof, said toggle links assuming diagonal positions with respect to the longitudinal axis of the bolt when the latter is in its projected position and moving to and slightly beyond the axis of alignment between the axis of rocking movement of said rocker link and the axis of pivotal connection of the remote ends of said toggle links to said bolt, in response to pressure applied to said trigger part, whereby to effect retraction of the bolt and holding of the bolt in its retracted position.

8. A flush latch for securing a marginal part of a closure panel having a marginal aperture therein, to a panel constituting a portion of the skin of an enclosure framing an opening to receive such closure panel in flush relation, comprising: an elongated casing disposed within said enclosure and attached to said closure panel with its outer side in communication with said aperture, said casing having an end registering with a margin of said closure panel; a latch bolt slidable longitudinally in said casing and normally projecting through said end thereof for engagement against the inner face of said framing panel to latch the panels together; actuator means embodying two push parts having respective areas of exposed surface normally flush with said outer side of the casing, for application of fingertip pressure thereto, said areas being arranged in series along the length of said casing, said actuator means including means pivoted to said casing for tilting movement on an axis disposed transversely of said casing intermediate the ends thereof and joining said push parts for unison movement wherein one of said parts, when pressed, will be depressed into the casing while the other of said parts will be projected outwardly of the plane of said one panel to constitute a handle for moving said closure panel to an open position; linkage connecting said actuator means to said bolt for retracting said bolt from said normally projecting position when said one push part is depressed as aforesaid, said linkage including means to hold said actuator means in the position of retraction of said bolt; and spring means loading said bolt for return movement to its said normally projected position when said holding means is released, the said other push part, when in its said projecting position, being operative when pressed to effect said release of the holding means and to allow said spring means to effect said return movement.

9. A latch as defined in claim 7 wherein said linking means comprises a projection on said rocker link extending parallel to the fulcrum axis thereof, a bearing land on said bolt, normally engaged by said projection for receiving bolt retracting movement therefrom when said rocker link is tilted by the depression of said trigger part, and a shoulder at the forward extremity of said land, disposed in generally circumferential relation to the fulcrum axis and positioned to be engaged by said projection to effect said holding action at the end of the bolt retracting tilting movement of said rocker link.

10. A latch as defined in claim 5, wherein said linking means comprises a cross pin secured to said rocker link and projecting transversely on an axis spaced rearwardly from the fulcrum axis of said rocker link, and a pair of transversely extending bearing lands formed in the respective slide arms of said bolt at one side of a pair of bayonet-form notches in the rear margins of said slide arms, said cross pin normally bearing against said lands so as to transmit retracting movement to the bolt when said rocker link is tilted by the inward movement of said trigger part, and said linking means further including a pair of shoulders at the forward extremities of the respective lands and in undercut relation thereto and extending generally circumferentially with respect to said fulcrum axis, whereby at the end of the bolt-retracting tilting movement of said rocker link, said cross pin will engage beneath said shoulders to effect said locking action.

References Cited in the file of this patent
UNITED STATES PATENTS

| | | |
|---|---|---|
| 2,416,889 | Andrews | Mar. 4, 1947 |
| 2,621,952 | Gauder | Dec. 16, 1952 |
| 2,711,336 | Cudney | June 21, 1955 |

OTHER REFERENCES

Automotive and Aviation Industries, May 1, 1944, page 27.